US005517018A

United States Patent [19]
Zheng et al.

[11] Patent Number: 5,517,018
[45] Date of Patent: May 14, 1996

[54] METHOD AND APPARATUS FOR ILLUMINATION AND IMAGING OF A SURFACE USING FAST EXPOSURE TIME

[75] Inventors: Joe Zheng, Brookfield, Conn.; John Sussmeier, Wappingers Falls, N.Y.

[73] Assignee: United Parcel Service of America, Inc., Atlanta, Ga.

[21] Appl. No.: 385,799

[22] Filed: Feb. 9, 1995

Related U.S. Application Data

[62] Division of Ser. No. 20,295, Feb. 19, 1993, Pat. No. 5,399,852.

[51] Int. Cl.⁶ .............................. H04N 3/14; G06K 7/00
[52] U.S. Cl. .................... 250/208.1; 235/462; 348/296; 358/483
[58] Field of Search .............................. 250/208.1, 225, 250/559.08, 559.09, 559.44; 235/462, 472, 454; 348/296, 312, 317, 319, 311, 249, 250; 358/482, 483

[56] References Cited

U.S. PATENT DOCUMENTS

| | | |
|---|---|---|
| 3,216,317 | 11/1965 | Nail . |
| 3,812,374 | 5/1974 | Tuhro . |
| 3,996,476 | 12/1976 | Lazzara . |
| 4,335,302 | 6/1982 | Robillard . |
| 4,488,679 | 2/1984 | Bockholt et al. . |
| 4,500,776 | 2/1985 | Laser . |
| 4,603,976 | 8/1986 | Fetzer et al. . |
| 4,737,653 | 4/1988 | Nakagawa et al. . |
| 4,739,159 | 4/1988 | Inokuchi . |
| 4,758,716 | 7/1988 | Mayer et al. ............................ 235/470 |
| 4,766,300 | 8/1988 | Chadima, Jr. et al. . |
| 4,785,171 | 11/1988 | Dowling, Jr. et al. . |
| 4,796,090 | 1/1989 | Fraier ...................................... 348/147 |
| 4,818,847 | 4/1989 | Hara et al. . |
| 4,851,914 | 7/1989 | Pfanhouser et al. .................... 348/217 |
| 4,877,949 | 10/1989 | Danielson et al. . |
| 4,896,029 | 1/1990 | Chandler et al. . |
| 4,947,291 | 8/1990 | McDermott . |
| 5,010,241 | 4/1991 | Butterworth . |
| 5,019,699 | 5/1991 | Koenck . |
| 5,027,418 | 6/1991 | Ikegaya et al. . |
| 5,028,138 | 7/1991 | Wolff . |
| 5,032,960 | 7/1991 | Katoh . |
| 5,046,159 | 9/1991 | Hamanaka . |
| 5,081,343 | 1/1992 | Chadima, Jr. et al. . |
| 5,129,726 | 7/1992 | Nielson . |
| 5,149,948 | 9/1992 | Chisholm . |
| 5,155,597 | 10/1992 | Lareau et al. ............................ 348/311 |
| 5,184,881 | 2/1993 | Karpen . |
| 5,285,056 | 2/1994 | Tedesco et al. . |
| 5,399,852 | 3/1995 | Zheng et al. ............................ 250/225 |

FOREIGN PATENT DOCUMENTS

| | | |
|---|---|---|
| 0104407 | 4/1984 | European Pat. Off. . |
| 0277378 | 8/1988 | European Pat. Off. . |
| 0385478 | 9/1990 | European Pat. Off. . |
| 0405965 | 1/1991 | European Pat. Off. . |
| 0524029 | 1/1993 | European Pat. Off. . |
| 2578339 | 9/1986 | France . |
| 2647285 | 4/1978 | Germany . |
| 3635768 | 4/1987 | Germany . |
| 8712320 | 10/1987 | Germany . |
| 3737792 | 5/1989 | Germany . |
| 1252108 | 11/1971 | United Kingdom . |

Primary Examiner—Edward P. Westin
Assistant Examiner—John R. Lee
Attorney, Agent, or Firm—James A. Drobile; William H. Murray; Robert E. Rosenthal

[57] ABSTRACT

An apparatus for illumination and imaging of a surface includes an apparatus for illuminating the surface, an apparatus for obtaining an image of the illuminated surface and providing an output signal representative of the obtained image, and an apparatus for limiting the exposure time of the image-obtaining apparatus to a selected fast exposure time less than the video frame rate of the image-obtaining apparatus. The image-obtaining apparatus may be a CCD-based camera. The CCD-based camera and the illumination apparatus may be mounted in a shroud having an opaque side wall. A first polarizing film may be provided intermediate the illumination apparatus and the surface, and a second polarizing film, having a polarization orientation orthogonal to that of the first polarizing film, may be provided intermediate the surface and the image-obtaining apparatus. Tip switches may be provided to prevent activation of the illumination apparatus and the image obtaining apparatus except when a lower edge of the shroud side wall is in contact with the surface.

14 Claims, 4 Drawing Sheets

METHOD AND APPARATUS FOR ILLUMINATION AND IMAGING OF A SURFACE USING FAST EXPOSURE TIME

This is a divisional of application Ser. No. 08/020,295 filed on Feb. 19, 1993, now U.S. Pat. No. 5,399,852.

BACKGROUND OF THE INVENTION

This invention relates to methods and devices for illuminating a surface and obtaining an image of the surface, and particularly to hand-held illumination and imaging devices for the purpose of reading labels having information in a code, such as a bar code, or an alphanumeric format.

Devices for imaging of surfaces provide an electronic representation of an image of the surface of an object. The representation in electronic form is then stored or transmitted to an appropriate data processing apparatus. If information is stored in the label in alphanumeric format, the image would be transmitted to a data processing apparatus having character recognition capacity. Typically, however, routine information is printed in a code format. A common example is a bar code label affixed to the surface of a package. The bar code label contains information about the package's origin, destination, order number, and the like. To retrieve the information from the bar code label, an appropriate imaging device electronically creates a digitized image of the bar code label. That image is then transferred to a processing computer. The processing computer deciphers the desired information from the digitized image.

An imaging device can be either machine-mounted or hand-held. Portable hand-held devices are especially useful when processing is required at remote locations. Such devices are also useful when the objects to which labels have been applied may be in a variety of sizes or positions.

The ability to retrieve data from the surface of an object depends largely on the quality of the digital image obtained by the imaging device. Glares, shadows and non-uniformity in illumination on the surface during the imaging process result in degradation of the digital image. More specifically, image processing software may be unable to reliably identify the optical characteristics (such as color) of every portion of the label. As a result, data will be lost. Uniform illumination over a surface is especially important when reading information on an alphanumeric label or in a two-dimensional encoded format where there is a minimum of redundancy.

Non-uniform ambient light is one source of non-uniformity in illumination. A second problem, which is particularly common in shipping of packages and letters, results from the practice of placing a shiny protective layer, such as transparent tape, over the label. Such tape will cause specular reflection from the surface, which will obscure the image of the underlying label.

A desirable goal in obtaining images of labels is to obtain the image as quickly as possible. This goal makes it desirable to be able to capture the entire image of a two-dimensional label substantially instantaneously.

The use of charge-coupled device based cameras has been proposed for obtaining images of labels. However, CCD-based cameras are subject to the drawback that the photocharges in the potential wells in the CCD array can exceed the capacity of the potential wells in the presence of intense illumination. Charges spill over into adjacent potential wells, which phenomenon is known as blooming. Blooming, of course, results in loss of information.

Furthermore, relative motion of the camera and the substrate can cause blurring of the obtained image. For example, a normal video exposure time is 0.033 seconds. In that time, an object moving at 5 inches per second moves 0.165 inches, which, in 100 dpi image resolution, is 16.5 pixels. Such a pixel shift will provide a very blurred image, with resulting loss of data.

It is an object of this invention to provide a method and apparatus for illumination and imaging of a surface which obtains accurate images in a short amount of time.

It is a particular object of this invention to provide a method and apparatus for illumination and imaging of a surface which employs a CCD-based camera which is not subject to blooming or to blurring.

It is a further particular object of this invention to provide an apparatus and method for illumination and imaging of a surface which is not subject to specular reflection from the surface.

Additional objects and advantages of the invention will become apparent from the detailed description of a preferred embodiment which follows.

SUMMARY OF THE INVENTION

An apparatus for illumination and imaging of a surface includes means for illuminating the surface, means for obtaining an image of the illuminated surface and providing an output signal representative of the obtained image, and shutter means for limiting the exposure time of the image obtaining means to a selected fast exposure time less than the video frame rate.

An apparatus for illumination and imaging of a surface includes a shroud having an opaque side wall, a lower edge of which side wall defines a bottom opening, means, mounted in the shroud, for illuminating the surface through the bottom opening, and means, comprising a CCD-based camera mounted in the shroud, for obtaining an image of the illuminated surface and providing an output signal representative of the obtained image.

An apparatus for illumination and imaging of a surface includes means for illuminating the surface, means for obtaining an image of the illuminated surface and providing an output signal representative of the obtained image, first light polarizing means intermediate the illuminating means and the illuminated surface, and second light polarizing means, orthogonal to the first light polarizing means, intermediate the illuminated surface and the image obtaining means.

A method for illumination and imaging of a surface includes the steps of illuminating the surface, obtaining an image of the illuminated surface while selectively limiting the exposure time to a selected fast exposure time less than the video frame rate and providing an output signal representative of the obtained image.

A method for illumination and imaging of a surface, includes the steps of providing a shroud having an opaque side wall, a lower edge of which defines a bottom opening, employing a light source mounted in the shroud to illuminate the surface through the bottom opening, and employing a CCD-based camera mounted in the shroud for obtaining an image of the illuminated surface and providing an output signal representative of the obtained image.

A method for illumination and imaging of a surface includes the steps of illuminating the surface with light polarized in a first direction, polarizing light reflected from the surface in a second direction, orthogonal to the first direction, obtaining an image of the illuminated surface from the polarized reflected light and providing an output signal representative of the obtained image.

DETAILED DESCRIPTION OF A PREFERRED EMBODIMENT

Figure 1:
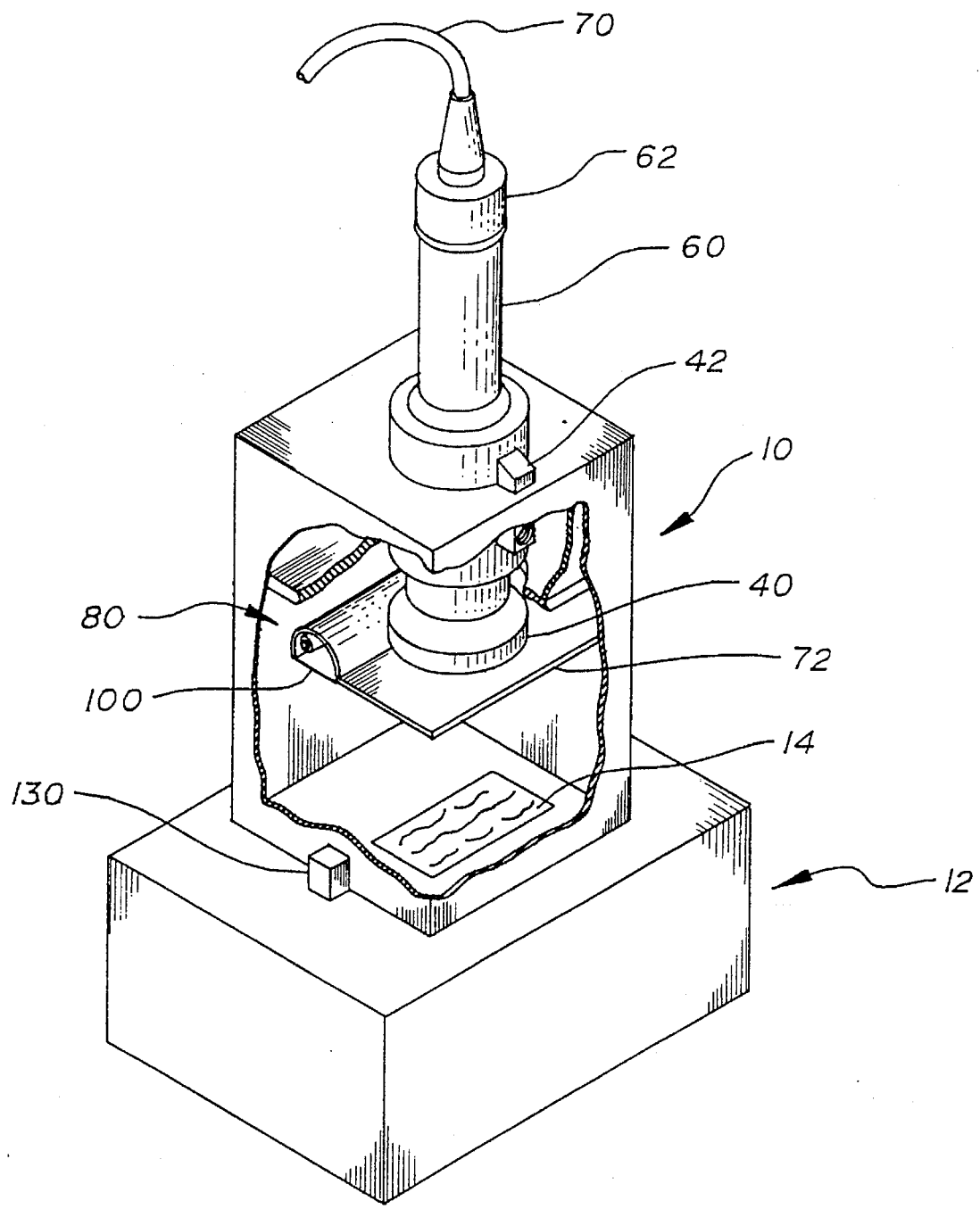
FIG. 1 is a perspective view with partial cutaway of an apparatus of the invention in use.
Figure 2:
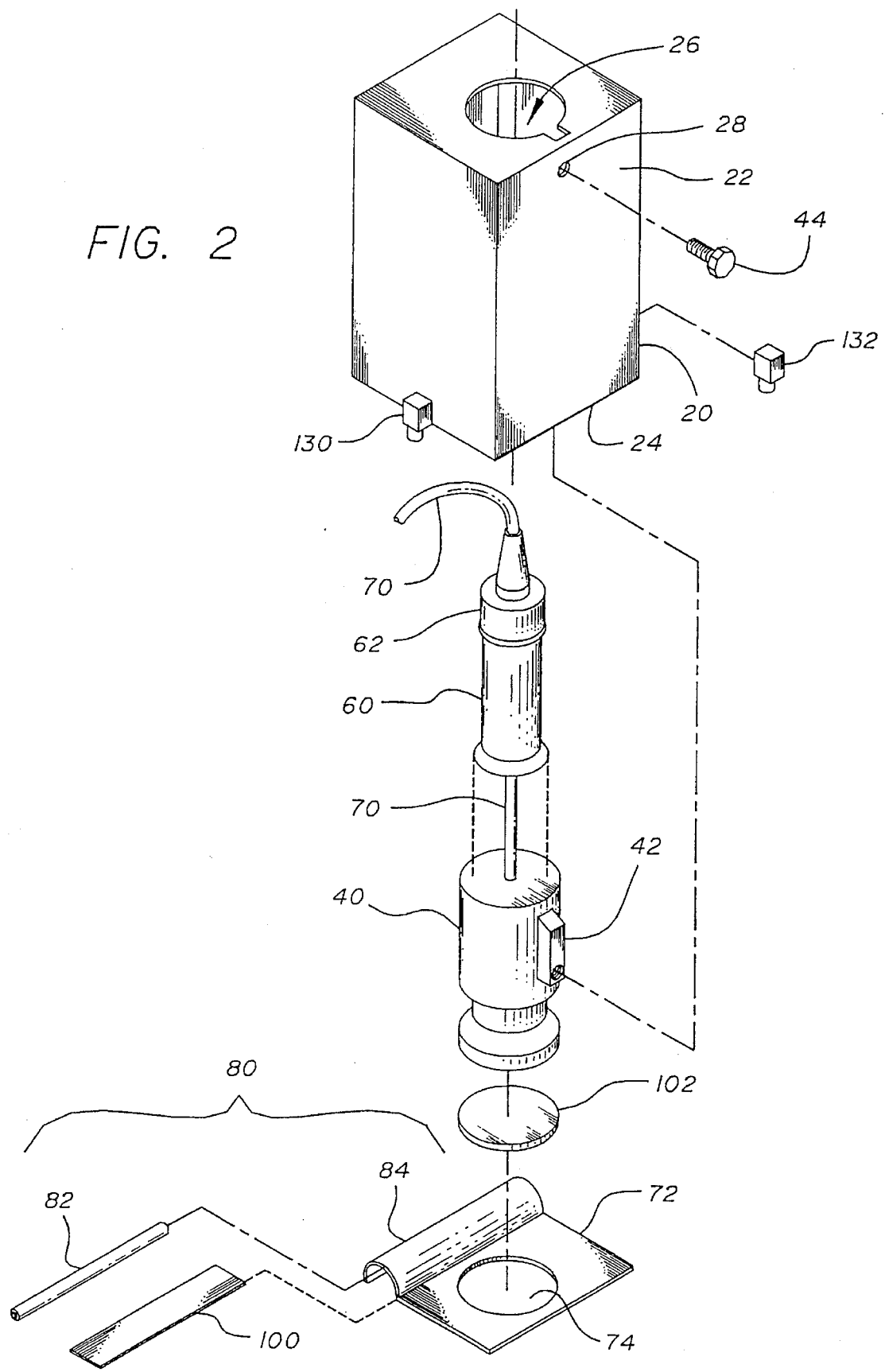
FIG. 2 is an exploded perspective view of an apparatus according to the invention.

Referring now to FIG. 1, there is depicted an illuminating and imaging apparatus 10 according to the invention in use illuminating and imaging a label 14 applied to a planar upper surface of a package 12. Referring to FIG. 2, apparatus 10 includes shroud 20, camera 40, handle 60, and illumination apparatus 80. Shroud 20 has an opaque, vertical sidewall 22. Vertical sidewall 22 has a lower edge which defines a bottom opening 24, and has a top opening 26. In the embodiment illustrated in the figures, sidewall 22 includes four planar panels, so as to provide a square cross-section. It will be understood that the form of vertical sidewall 22 may be selected as desired. For example, the vertical sidewall 22 may be rectangular, or cylindrical in plan. Ordinarily, vertical sidewall 22 will be selected so that the shape of bottom opening 24 is the same as the shape of a surface to be illuminated. The shape of the bottom opening 24 may also be selected so as to be the same as the shape of the array of an imaging device. It will also be appreciated that vertical sidewall 22 need not be precisely vertical.

Camera 40, which in the illustrated embodiment has a substantially cylindrical housing, is disposed through top opening 26 in shroud 20. Camera 40 is mounted in an upper portion of shroud 20 by bracket 42 on the side of the housing of camera 40. Camera 40 is secured to shroud 20 by a fastener 44 disposed through hole 28 through sidewall 22. Camera 40 is an apparatus that obtains an image of a surface, such as the surface of package 12 illustrated in FIG. 1, and produces a signal representative of the obtained image of the surface. Camera 40 may be, for example, a CCD-based camera. An example of a suitable CCD-based camera is a Pulnix TM-7X, with a Tamron 6.5 mm. lens. Appropriate power and signal lines are provided through cable 70 to an external power supply (not shown), controller 110 and signal processor 120 (shown schematically in FIG. 4). The power supply provides electrical power for operation of camera 40 and illumination apparatus 80. The signal lines in cable 70 transmit control signals from controller 110 to camera 40 and trigger 85, and transmit from camera 40 to signal processor 120 an output signal representative of the image obtained by camera 40.

Referring again to FIGS. 1 and 2, handle 60 is mounted on the upper face of the housing of camera 40. Handle 60 is generally cylindrical, and provides a convenient hand grip for an operator. Preferably, there is provided a hand switch 62, which an operator can use for providing a signal to controller to begin the sequence of illuminating the surface and obtaining the image. Hand switch 62 may be an omnidirectional switch.

Illumination apparatus device 80 is mounted in an upper portion of shroud 20, mounted on horizontal plate 72, which is preferably mounted within an upper portion of shroud 20 about a lens of camera 40. In the illustrated embodiment, lighting apparatus 80 is a linear xenon flash lamp or strobe light. Illumination apparatus 80 includes a flash lamp tube 82, which is mounted in a reflector 84. Reflector 84 may have a surface of bubble alzac, or reflective aluminum. Suitable electrical connections (not shown) provide current to cause the flash lamp tube 82 to flash. Horizonal planar support plate 72 is provided with an aperture 74 therethrough for permitting light from the surface to pass through to camera 40. Suitable conventional fixtures may be provided for mounting flash tube 82 in reflector 84.

There are further provided first polarizing film, or polarizer, 100 and second polarizing film, or analyzer, 102. First polarizing film 100 is provided beneath illumination apparatus 80. First polarizing film 100 is so positioned that all light emitted by illumination apparatus 80 is transmitted through first polarizing film 100 before reaching an illuminated surface through bottom opening 24 of shroud 20. Second polarizing film 102 is mounted on the aperture of camera 40. Second polarizing film 102 is thus so mounted that light reflected from a surface will pass through second polarizing film 102 before entering camera 40. First polarizing film 100 has a first selected polarization orientation, and second polarizing film 102 has a second selected polarization orientation, 90° from the polarization orientation of first polarizing film 100. The use of the combination of first polarizing film 100 in the path of light from illumination apparatus 80 to the surface, and second polarizing film 102, having a polarization orientation at a 90° angle from the polarization orientation of first polarizing film 100, in the path of light reflected from the illuminated surface to the camera 40, eliminates the effect of specular reflection of light from the surface. The use of first polarizing film 100 and second polarizing film 102 is particularly advantageous where apparatus 10 is used to read labels that may be covered with a shiny coating such as a transparent tape.

Figure 4:
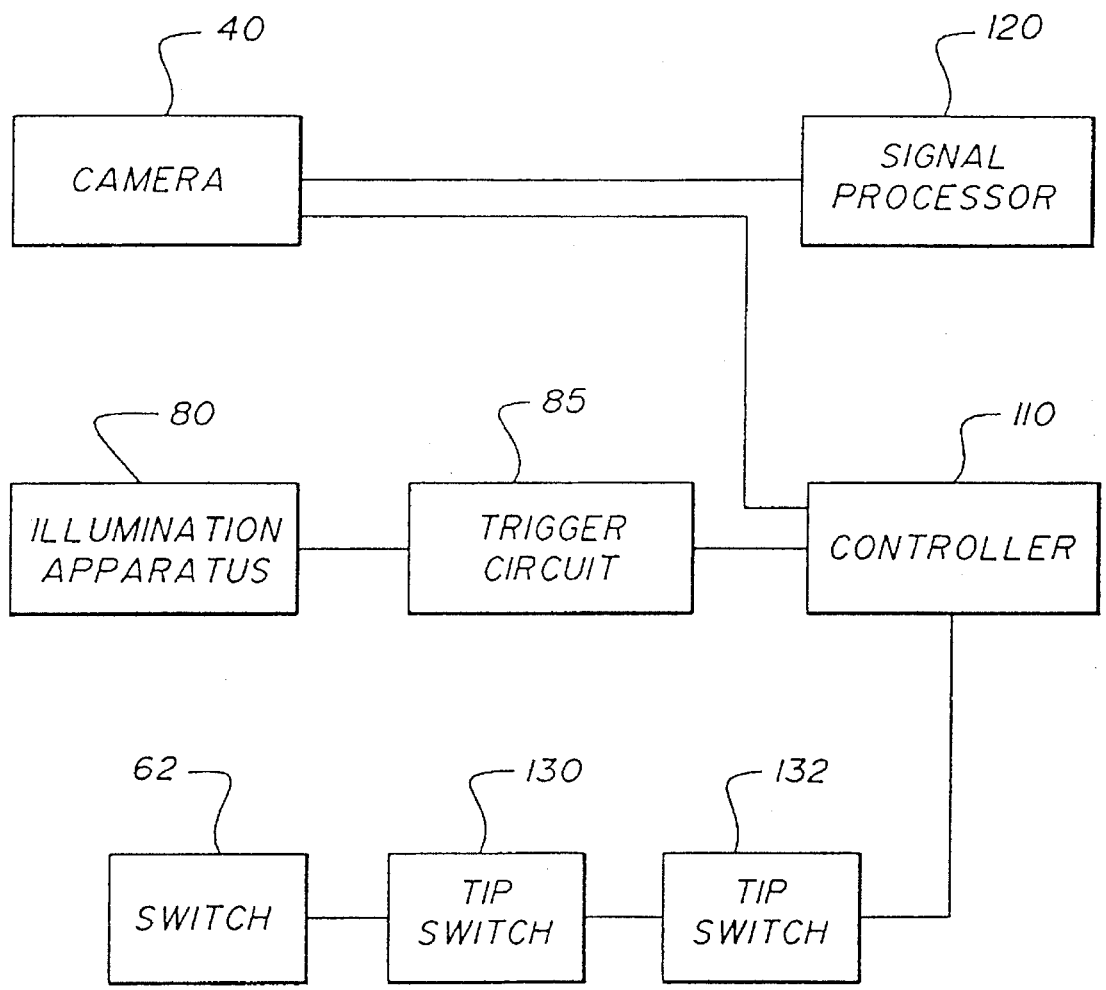
FIG. 4 is a block diagram showing a controller, and signal processor as used with an apparatus according to the invention.

Tip switches 130, 132 are provided at two opposite points on the lower edge of shroud 20. Tip switches 130, 132 are closed when the respective points on the lower edge of shroud 20 engage a surface. As shown in FIG. 4, tip switches 130, 132 are connected in series with hand switch 62. The signal from hand switch 62 will only be transmitted when both lower edges of shroud 20 are in contact with a surface, such as the surface of package 12 of FIG. 1. As a result, tip switches 130, 132 serve to prevent activation of illumination device 80 and of camera 40, except when the lower edge of shroud 20 is in contact with the surface.

This configuration of tip switches 130, 132 serves both safety and image quality goals. First, illumination apparatus 80 cannot be inadvertently activated while directed at someone's eyes. Because the flash lamp intensity is high, eye discomfort could be caused if the device were activated while directed at someone's eyes. Second, the configuration of tip switches 130, 132 assumes that the camera cannot be activated while a gap exists between the points on the lower edge of shroud 20 where tip switches 130, 132 are located, and a surface. As a result, the quantity of ambient light reaching the surface will be minimized. If, as shown, the lower edge of shroud 20 lies in a plane, this configuration of tip switches 130, 132 assures that substantially no ambient light will reach a planar surface within the shroud.

An electronic shutter is preferably provided for control of the CCD-based camera. A COD-based camera conventionally allows charge to accumulate in the potential wells for a period of time equal to the video frame rate. At the end of this period of time, the charge is read out in accordance with conventional techniques. The video frame rate (or video frame length or video exposure time) is conventionally 1/30 seconds. However, it has been found by the inventors, in using device 10, that the illumination produced by illumination apparatus 80 is so great that the photo-charges in many of the potential wells of a COD array will exceed the capacity of the potential wells, if charges are permitted to accumulate for a time equal to the video frame rate. In addition, it is desirable to reduce the exposure time as much as possible to prevent loss of clarity caused by relative movement of the camera and the label.

Figure 3:
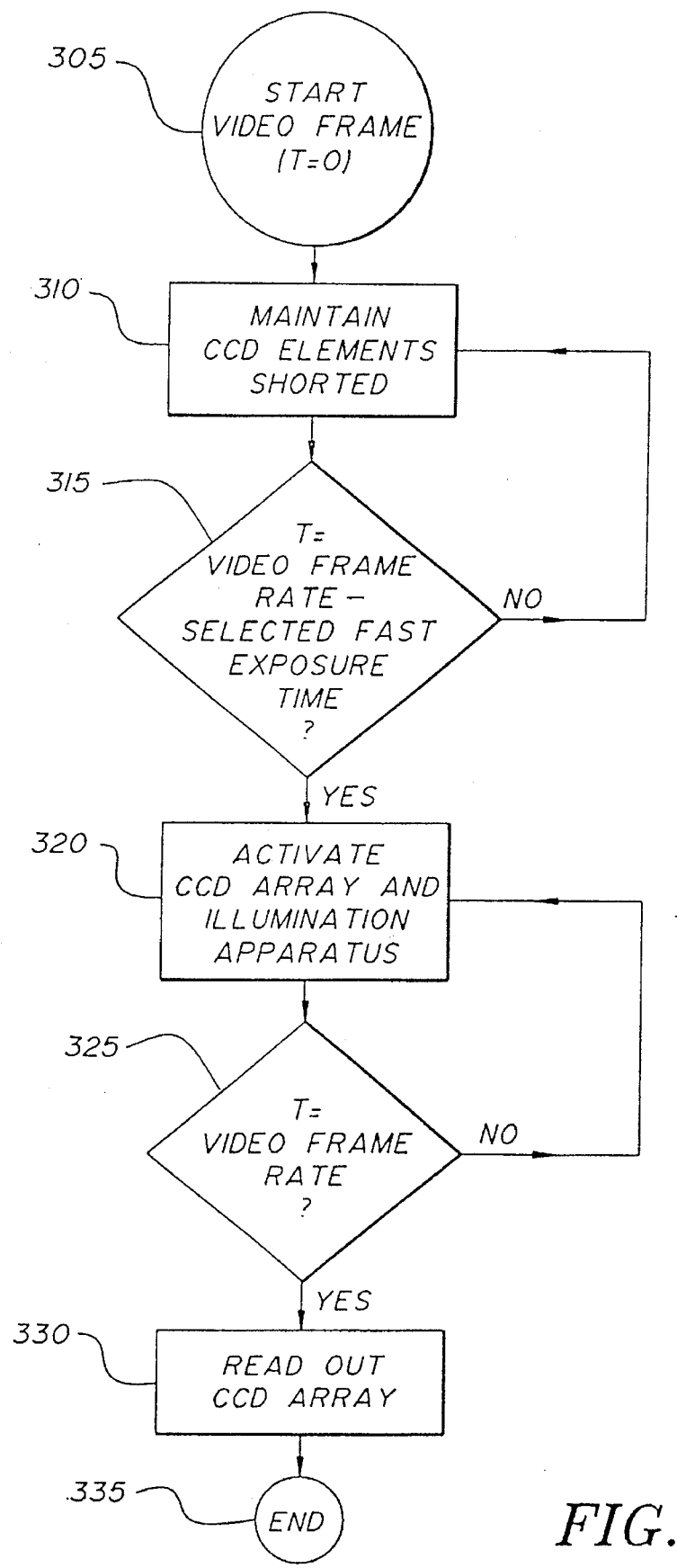
FIG. 3 is a flow chart illustrating operation of a shutter circuit in an apparatus according to the invention.

Referring now to FIG. 3, there is shown a flow chart illustrating the sequence of operation of an electronic shutter according to the invention. The electronic shutter is preferably provided in controller 110, either in software or hardware. At box 305, labeled "START VIDEO FRAME (T=0)," a new video frame has started. At the start of the video frame, at time T= 0, there is no charge stored in any of the elements of the CCD array.

Immediately after time T= 0, each element in the CCD array is maintained in a shorted condition, so that no charge can accumulate in any of the elements of the CCD array. In other words, the electronic shutter is closed. This step is illustrated by box 310, labeled MAINTAIN CCD SHORTED.

The time T from the beginning of the video frame is then continuously compared to a time equal to the length of a video frame less a selected fast exposure time. This is illustrated by box 315, labeled T= VIDEO FRAME LENGTH–SELECTED FAST EXPOSURE TIME? If the time T is less than the video frame rate less the selected fast exposure time, the controller continues to maintain the elements in the CCD array shorted, as indicated by the arrow marked "NO" leading from box 315.

If the time T is equal to the video frame length less the selected fast exposure time, then, as indicated by box 320, labeled "ACTIVATE CCD ARRAY AND ILLUMINATION APPARATUS," the controller provides a signal so that the elements of the CCD array are no longer shorted, and the elements begin to accumulate charge. Simultaneously, illumination apparatus 80 is activated by a signal provided from the controller to trigger 85. As a result, the elements in the CCD array will be exposed to light reflected during illumination of the surface and will accumulate charge.

Time T is compared to the length of the video frame, as shown by box 325, labeled T= VIDEO FRAME LENGTH? . As long as the time T is less than the video frame length, the CCD array remains activated, and individual elements accumulate charge as light impinges on them. This is indicated by the arrow marked NO from box 325 to box 320. As shown by the arrow marked YES from box 325 to box 330, when the time is equal to the video frame length, the CCD array is read out, as indicated by box 330, labeled READ OUT CCD ARRAY. The process is then at an end, as indicated by box 335.

It will be understood that by the foregoing process, the time that the elements in the CCD array are accumulating charge is maintained as short as possible. This will prevent blurring, due to relative movement of apparatus 10 and the surface, and will also prevent blooming due to excessive exposure time. The use of an electronic shutter provides precise control over the selected fast exposure time. In addition, the use of the electronic shutter, combined with activation of the illumination apparatus simultaneously with the opening of the electronic shutter, assures that the light reflected from the surface is primarily light generated by the illumination apparatus. The use of an electronic shutter thereby minimizes the influence of ambient light. This in particular assures that, with the use of first and second polarizing films 100, 102, oriented at a ninety degree angle to one another, as explained above, the glare from the surface will be eliminated or minimized.

It is preferred that the selected fast exposure time be substantially shorter than the video frame rate, and preferably as fast as possible, provided that the illumination intensity is great enough. In a tested embodiment, a selected fast exposure time of one millisecond provided good results. This selected fast exposure time is thus 1/33 the video frame rate. The selected fast exposure time may be set, on an empirical basis, by those of skill in the art. If, after using a selected fast exposure time, blooming or blurring are observed, then the selected fast exposure time should be shortened. If after using a selected fast exposure time, obtained intensity levels were too low to distinguish different optical properties, the selected fast exposure time should be increased.

Referring now to FIG. 4, there is illustrated a block diagram of an apparatus according to the invention with its controller and signal processor. Controller 110 provides control signals to camera 40 and illumination apparatus trigger circuit 85. Tip switches 130, 132, are disposed in the circuit intermediate switch 62 and controller 110. As explained above, the control signals from controller 110 provide for an electronic shutter to time operation of camera 40,, as well as for timing of the triggering of illumination apparatus 80. Trigger circuit 85 customarily includes an electrical energy storage device, such as one or more capacitors. Upon receipt of a signal from controller 110, trigger circuit 85 allows current to flow from such capacitors to illumination apparatus 80. Camera 40 provides a signal, representative of the light reflected from the surface, to signal processor 120.

Many variations are possible within the scope of the invention. For example, the light source illumination apparatus 80 need not be a flash lamp. Illumination apparatus 80 may include, for example, an array of light-emitting diodes, a diffuse light source, or any other type of light source. An intense light source, such as a flash lamp, is advantageous in that it will tend to minimize the influence of ambient light on the total illumination of the surface. As a result, non-uniformities in ambient illumination will contribute relatively little to total illumination. Intense illumination, such as that from a flash lamp, also permits the aperture of the camera lens to be adjusted to a minimum, to provide the greatest depth of field. Depth of field is particularly useful when a label is applied to a curved surface, such as a tube.

Shroud 20, in combination with illumination apparatus 80 and camera 40, is highly advantageous. Shroud 20, is opaque, and in operation has only bottom opening 24. As a result shroud 20 substantially eliminates the illumination of the surface by ambient light. As a result, illumination of the surface will be substantially entirely as a result of lighting apparatus 80. Thus, uniformity of illumination may be controlled. In addition, polarization of light illuminating the surface may be controlled, to reduce specular reflection. Control of the intensity of illumination is also achieved. This assures that the apparatus may successfully be used even where ambient illumination is very intense, such as in direct sunlight. The distance between the lens of camera 40 and the surface is maintained constant, thereby eliminating the need to refocus the camera. The device according to the invention can be implemented in a hand-held configuration.

It will also be appreciated that a CCD-based camera, while advantageous, is not necessarily required for practice of certain embodiments of the invention. Rather, other devices may be used which obtain an image of the illuminated surface and provides an electronic output signal representative of the obtained image. A vidicon or similar device may conceivably also be employed.

In a particularly preferred embodiment, given only by way of example, camera 40 is mounted three inches above the bottom edge of the shroud, and has a field of view 2.5 inches across. The shroud has dimensions of 3.75 inches in height. The reflector 84 has an inner diameter of 0.8 inches, and extends in an arc of 225°. The axis of the lamp is mounted 1.45 inches away from the camera optical center, and 0.234 inches radially from the axis of the reflector 80. The selected short exposure time may be about 1 millisecond.

It will be appreciated that there are considerable variations that can be accomplished in a method and apparatus of the invention without departing from its scope. As a result, although a preferred embodiment of the method and apparatus of the invention has been described above, it is emphasized that the invention is not limited to a preferred embodiment and there exist other alternative embodiments that are fully encompassed within the invention's scope, which is intended to be limited only by the scope of the appended claims.

What is claimed is:

1. An apparatus for illumination and imaging of a surface, comprising:
   (a) means for illuminating the surface;
   (b) means for obtaining an image of the illuminated surface and providing an output signal representative of said obtained image, said image obtaining means having a video frame rate; and
   (c) means for limiting the exposure time of said image obtaining means to a selected fast exposure time less than the video frame rate.

2. The apparatus of claim 1, wherein said image obtaining means comprises a charge-coupled device-based camera.

3. The apparatus of claim 1, wherein said selected fast exposure time is about 1 millisecond.

4. The apparatus of claim 2, wherein said exposure time limiting means comprises means for shorting each element of the CCD array of said camera at the beginning of each video frame for a time equal to the video frame rate less said selected fast exposure time.

5. The apparatus of claim 4, further comprising means for activating said means for illuminating the surface simultaneously with the commencement of said exposure time.

6. The apparatus of claim 1, further comprising means for reducing the illumination of the surface by ambient light.

7. The apparatus of claim 6, wherein said means for reducing the illumination of the surface by ambient light comprises a shroud having an opaque side wall, a lower edge of said side wall defining a bottom opening, said illuminating means being mounted in said shroud to illuminate the surface through said bottom opening.

8. A method for illumination and imaging of a surface comprising the steps of:
   (a) illuminating the surface;
   (b) obtaining an image of the illuminated surface by using an image-obtaining apparatus having a video frame rate, while selectively limiting an exposure time to a selected fast exposure time less than the video frame rate; and
   (c) providing an output signal representative of the obtained image.

9. The method of claim 8, wherein said step (b) comprises using a charged-coupled device-based camera.

10. The method of claim 8, wherein said fast exposure time is about 1 millisecond.

11. The method of claim 9, wherein said step (b) further comprises shorting each element of said camera at the beginning of each video frame for a time equal to the video frame rate less said selected fast exposure time.

12. The method of claim 8, wherein said selected fast exposure time commences simultaneously with said step of illuminating the surface.

13. The method of claim 8, further comprising the step of, simultaneously with said step (a), reducing the illumination of the surface by ambient light.

14. The method of claim 13, wherein said step of reducing comprises providing a shroud having an opaque side wall, a lower edge of said side wall defining a bottom opening, said illuminating means being mounted in said shroud to illuminate the surface through said bottom opening.

* * * * *